(No Model.)
H. C. F. OTTE.
APPARATUS FOR WORKING UP ANIMAL CARCASSES, &c.
No. 547,801. Patented Oct. 15, 1895.
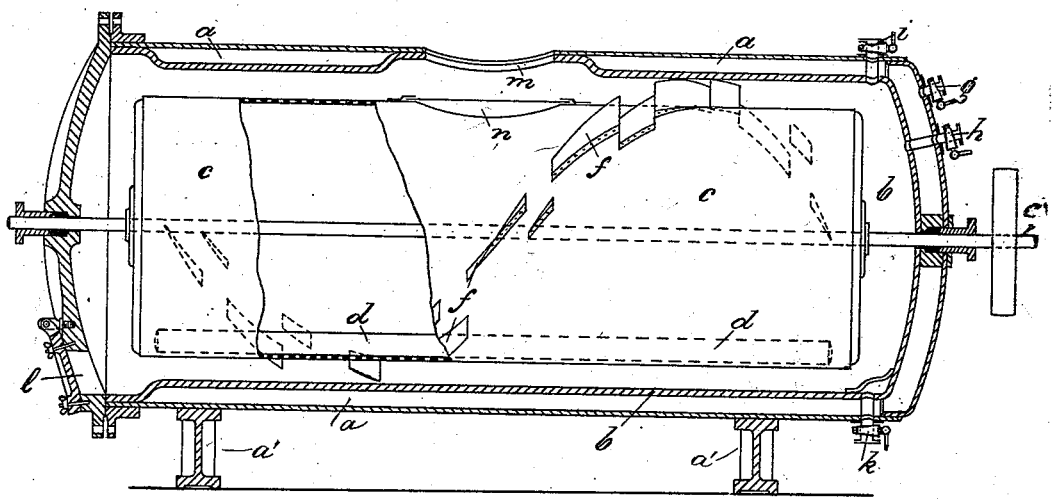
Witnesses:
William Schulz.
John Becker
Inventor:
Heinrich Conrad Fritz Otte
by his attorneys
Roeder & Friesen

UNITED STATES PATENT OFFICE.

HEINRICH CONRAD FRITZ OTTE, OF ALTONA, GERMANY.

APPARATUS FOR WORKING UP ANIMAL CARCASSES, &c.

SPECIFICATION forming part of Letters Patent No. 547,801, dated October 15, 1895.

Application filed June 1, 1895. Serial No. 551,397. (No model.) Patented in Germany September 28, 1894, No. 81,493.

*To all whom it may concern:*

Be it known that I, HEINRICH CONRAD FRITZ OTTE, a subject of the King of Prussia, German Emperor, and a resident of Altona, Germany, have invented certain new and useful Improvements in Apparatus for Working Up Animal Carcasses and Offals of Meat, (for which I have obtained a patent in Germany, No. 81,493, dated September 28, 1894,) of which the following is a specification.

This invention relates to an apparatus for converting animal carcasses and offals into glue, manure, and other useful products.

The accompanying drawing represents a vertical longitudinal section of my improved apparatus.

The letter $b$ represents a cylinder which is partly surrounded by a steam-jacket $a$ and is supported in an inclined position upon feet $a'$. Through the cylinder $b$ extends axially a power-shaft $c'$, which carries a drum-sieve $c$, which is thus free to be revolved within the cylinder. The surface of the drum-sieve is provided with a helical conveyer-screw $f$, that projects into the annular space between drum-sieve and cylinder. The thread of this screw is broken away in parts to permit the screw to pass freely through the liquid contents of the cylinder. Within the drum there is placed loosely a crushing-cylinder $d$, which will not participate in the rotation of the drum, but will lie upon the bottom of the same and exert a grinding action upon the contents of the drum as the latter are being carried around. The cylinder $b$ is provided with the charging-opening $m$, and the drum $c$ is provided with a corresponding charging-opening $n$, adapted to be brought into alignment with opening $m$.

$g$ is a steam-inlet entering the jacket $a$.

$h$ is a steam-inlet; $i$, a vent; $k$, a liquid-outlet, and $l$ a discharge-orifice of cylinder $b$.

The operation of the apparatus is as follows: The offal, carcass, or other matter to be treated is thrown into the drum $c$, the charging-opening $n$ is closed, and motion is imparted to shaft $c'$. At the same time steam is admitted through pipe $g$ into the jacket $a$ while the vent $i$ is opened. In this way the contents of drum $c$ will be subjected to an intense heat, which will evaporate the liquid particles contained in drum $c$, the vapor and air escaping through vent $i$. After the offal, &c., has thus been thoroughly dried, steam is admitted into cylinder $b$ through pipe $h$, while the vent $i$ is closed as soon as all the air has escaped. The steam acting now directly upon the dried offal, &c., will liquefy its soluble parts, which will drip through the meshes of the drum into the cylinder $b$. After this liquefaction is completed, the steam is turned off and the tap $k$ is opened, so that the liquid will escape. Next the tap is closed, the steam again admitted into jacket through pipe $g$, and the vent $i$ and orifice $l$ opened. The steam will now completely dry the disintegrated solid fiber or particles contained within the drum, and these dried particles will be powdered by the crushing-cylinder $d$, which by its own weight bears upon the particles as the latter are being carried around by the drum. The powder will fall through the meshes of the drum into the cylinder $b$, where it is at once engaged by the conveyer-screw $f$, which conducts it out of the apparatus through the discharge-orifice $l$, when the operation is completed.

What I claim is—

1. The combination of a jacketed cylinder with an inclosed revoluble drum-sieve, having a peripheral conveyer screw and with a crusher within the drum sieve, substantially as specified.

2. The combination of a jacketed cylinder with an inclosed revoluble drum-sieve having an outer helical conveyer screw that is partly broken away, and with a crushing cylinder contained within the drum-sieve, substantially as specified.

Signed at Hamburg, Germany, this 2d day of May, A. D. 1895.

HEINRICH CONRAD FRITZ OTTE.

Witnesses:
MAX. FOUGUCT,
KARL KUSSICKE.